June 9, 1953 E. M. POIROT 2,641,455
DEVICE WHICH AERATES WATER
Filed June 24, 1949
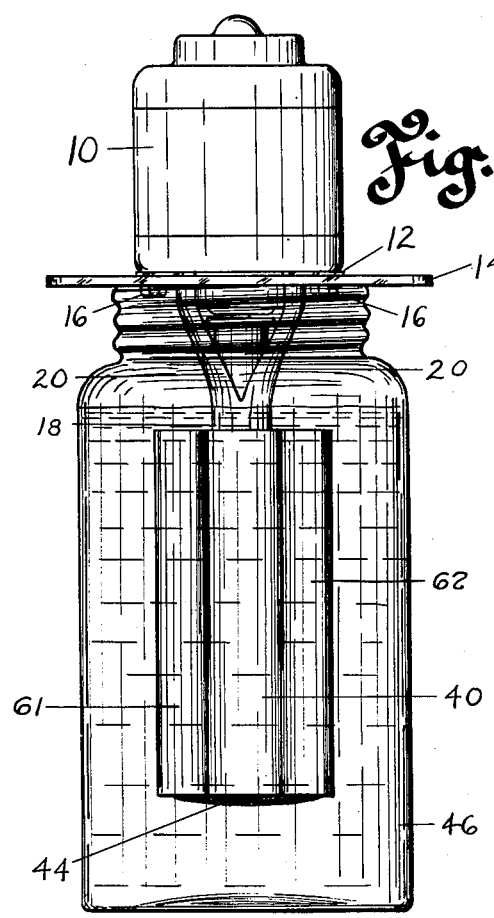
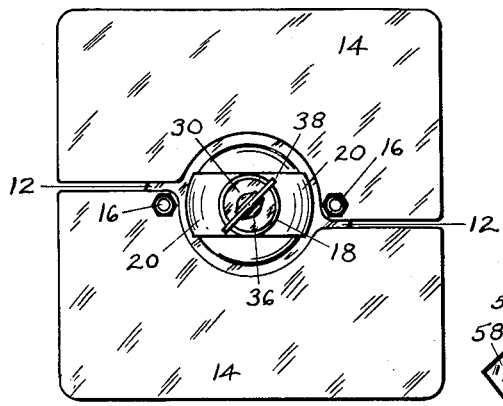
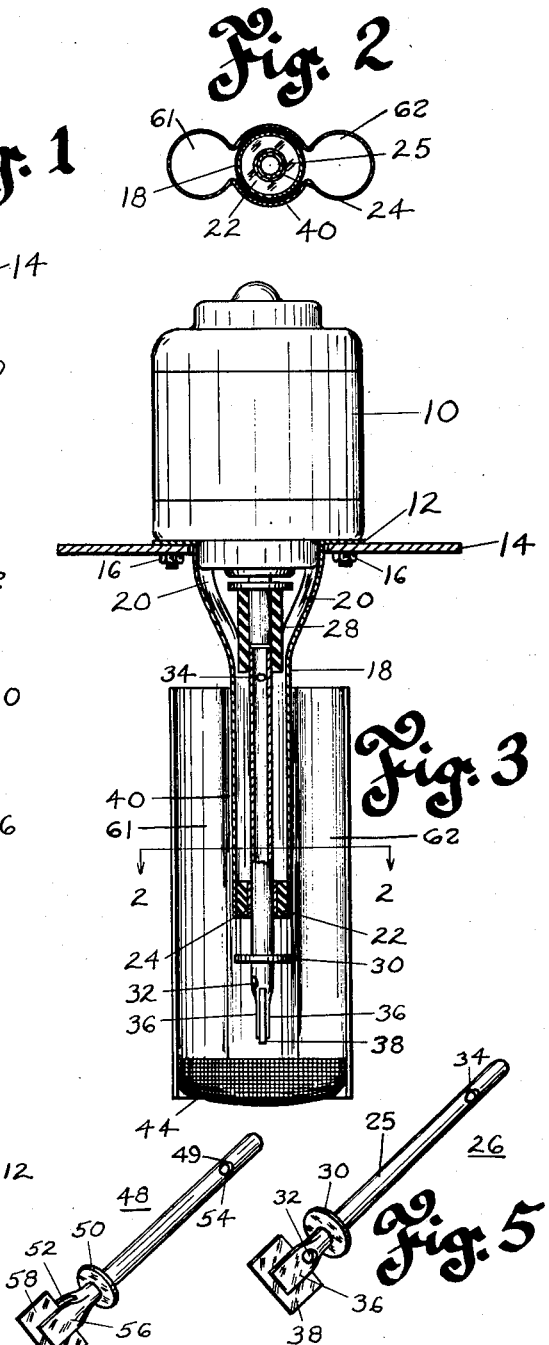
INVENTOR
Eugene M. Poirot
BY
Rey Eilers
ATTORNEY Patented June 9, 1953

2,641,455

UNITED STATES PATENT OFFICE 2,641,455

DEVICE WHICH AERATES WATER

Eugene M. Poirot, Lawrence County, Mo.

Application June 24, 1949, Serial No. 101,129

2 Claims. (Cl. 261—29)

This invention relates to improvements in devices which aerate water. More particularly, this invention relates to an improved device which facilitates the aeration of water in which fish are to be kept.

It is therefore an object of the present invention to provide an improved device which facilitates the aeration of water in which fish are to be kept.

In the care and handling of fish it is necessary to provide a way of continuously dissolving oxygen in, and liberating carbon dioxide ($CO_2$) from, the water in which fish live; because the fish will consume the oxygen initially dissolved in the water and will yield carbon dioxide ($CO_2$) to the water. In some instances, where limited numbers of fish are kept in pools or large aquariums, it is possible to grow vegetable matter in the water which will yield oxygen to the water and will absorb carbon dioxide ($CO_2$) from the water. In other instances, the use of vegetable matter which will yield oxygen and absorb carbon-dioxide ($CO_2$) is not practicable; and in those instances a mechanical device must be provided to facilitate dissolution of oxygen in, and liberation of carbon dioxide ($CO_2$) from the water. For example, where a large number of fish are kept in a small aquarium or where fish are being transported in containers or receptacles, mechanical devices must be provided to facilitate the introduction and dissolution of oxygen in the water in the aquarium, container or receptacle. In the absence of such mechanical devices, the fish in the aquarium, container or receptacle would quickly consume the oxygen dissolved in the water and would die. This has happened repeatedly; and it happens frequently when fishermen purchase minnows for use as bait, place those minnows in a receptacle or container, and drive several miles to a fishing area. In such instances the fishermen invariably find, unless they use an aerating device for the water in which the fish are kept, that many and in some cases half of the minnows have died enroute. This not only constitutes a financial loss but it also limits the sport.

The present invention provides an impeller which extends down into the water in an aquarium, container or receptacle, draws air down into the water, breaks the water up into small droplets, forms very small air bubbles, and forces those bubbles into the water under pressure. Where this is done, the air will have a large surface-to-volume ratio and it will be subjected to a water pressure that is in addition to atmospheric pressure. As a result, the dissolution of oxygen in, and the liberation of carbon dioxide ($CO_2$) from, the water will be greatly facilitated. It is therefore an object of the present invention to provide an impeller that extends down into the water in an aquarium, container or receptacle, draws air down into the water, breaks the water up into small droplets, and forces minute bubbles or air into that water.

The water-aerating device provided by the present invention has a hollow impeller; and that impeller conducts air down to an outlet below the surface of the water. That air will be intimately admixed with the water by the impeller. The resulting mixture of air and water will rise to the surface of the water, and additional quantities of water will move to the vicinity of the outlet for air to be admixed with additional quantities of air. As the air and water are admixed, and as the mixture of air and water rises, the water will absorb considerable quantities of air. It is therefore an object of the present invention to provide an impeller for water-aerating devices that is hollow and that conducts air to an outlet below the surface of the water for admixing with the water.

The impeller provided by the present invention has a transversely-extending blade of resilient material adjacent the bottom thereof. This blade will, when the impeller is rotating, respond to the resistive force of the water and bend until it assumes a curvature comparable to that of an air foil. That curvature will lead to the creation of reduced pressure areas behind the blade, and those areas will encourage withdrawal of air from the outlet of the impeller. In addition those reduced pressure areas will enhance absorption of the air by the water by momentarily holding that air in areas of reduced pressure and then forcing that air to pass outwardly into the water where it will be subjected to greater pressure. It is therefore an object of the present invention to provide a transversely extending blade of resilient material adjacent the bottom of the impeller of a water-aerating device.

The water-aerating device provided by the present invention is quite efficient and it can be operated with but little power; because it draws water in at the bottom, mixes that water with air, and then directs the mixture of air and water upwardly. This arrangement enables the device to utilize the difference between the weight of water and the weight of air-water mixtures to promote ready, uni-directional flow upwardly past the impeller. By having that flow directed upwardly, the present invention obviates the difficulty of trying to force air downwardly through water. It is therefore an object of the present invention to provide a water-aerating device that draws water in at the bottom, mixes that water with air, and then directs the mixture of air and water upwardly.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

In the drawing, Fig. 1 is a side elevational view of a water-aerating device that is made in accordance with the principles and teachings of the present invention, and it shows that device as it appears when used with a large jar, Fig. 2 is a cross-sectional, plan view of the water-aerating device of Fig. 1, and it is taken along the plane indicated by the line 2—2 of Fig. 3, Fig. 3 is a partially sectioned side elevational view of the water-aerating device of Fig. 1, Fig. 4 is a bottom view of the water-aerating device of Figs. 1–3, and it shows that device with the guard removed, Fig. 5 is a perspective view of the impeller of the water-aerating device shown in Figs. 1–4, and Fig. 6 is a perspective view of a modified form of impeller that is usable with the water-aerating device of Figs. 1–4.

Referring to the drawing in detail, the numeral 10 denotes an electric motor which is adapted to be connected to a source of electric power by leads, not shown. Where the water-aerating device is to be transported in a vehicle, the source of power will usually be the battery of the vehicle. Where the water-aerating device is to be installed permanently within a structure, the source of power will usually be the electrical system of that structure. A flange 12 is secured to the bottom of the motor 10; and two generally rectangular plates 14, with semi-circular notches in their inner edges, are rotatably secured to the flange 12 by nuts and bolts 16. The nuts and bolts 16 can be tightened to hold the plates 14 against rotation relative to the flange 12, but they can also be loosened to permit such rotation. Loosening of the nuts and bolts 16 will permit the plates 14 to be rotated in a clockwise direction; and where this is done, the plates 14 will be able to span large diameter openings. The rotation of the plates 14 must be simultaneous lest the edge of one plate strike and be obstructed by the edge of the other plate. In the position shown in Fig. 4, the plates 14 do not take up much space; and yet those plates can be set to support the water-aerating device atop containers with large openings.

The semi-circular notches in the plates 14 are registerable with each other, as shown in Fig. 4, to define a circular opening; and that opening is large enough to receive an elongated impeller housing 18. That housing has two spaced arms 20 at the upper end thereof which extend to and are supported by the flange 12. These arms may be welded or otherwise secured to flange 12; and when so secured, they rigidly secure housing 18 to flange 12 while holding housing 18 precisely coaxial with the shaft of the motor 10.

A rubber bushing 22 is provided adjacent the lower end of the housing 18, and that bushing supports a metal sleeve bearing 24. This metal sleeve bearing will be held precisely concentric with the shaft of the motor 10, and it will receive the lower end of an impeller 26. This impeller has a hollow body 25, and it is cylindrical throughout most of its length. The upper end of the impeller 26 extends into and is held by a connector 28 of rubber or other resilient material; the connector 28 also fitting over and tightly engaging the shaft of the motor 10. The connector 28 thus holds the impeller for coaxial rotation with the shaft of motor 10.

A washer 30 is disposed adjacent the lower end of the impeller 26, and that washer projects radially outwardly beyond the periphery of the body of that impeller. This washer is disposed closely above an outlet opening 32 in the wall of impeller 26, and it serves to hold air issuing from that outlet momentarily in contact with the water around the impeller. An air inlet 34 is disposed adjacent the top of the impeller 26, and that inlet permits air to pass into the impeller for movement downwardly to the outlet 32. The flattened portions 36 at the bottom of the impeller define a slot into which a blade 38 of rubber or resilient material can be inserted. This blade projects radially outwardly beyond the edges of the flattened portions 36, and it is disposed slightly below the outlet 32.

An elongated guard 40 telescopes over the elongated impeller housing 18, and that guard directly engages the walls of that housing, as particularly shown in Fig. 2. The guard 40 is, in effect, the center cylinder of three cylinders surrounding impeller housing 18, and each of the outer cylinders 61 and 62 are contiguous with the center cylinder. The outer cylinders 61 and 62 constitute recesses which extend up to the top of the guard 40. A screen 44, of cup-like configuration, is dimensioned to fit within the bottom of guard 40 and the outer cylinders 61 and 62.

This water-aerating device is adapted to be used with a container, such as the jar 46; and when so used, the plates 14 will rest upon the mouth of that jar. The jar 46 is preferably filled with water to a level above the top of guard 40 but below the arms 20 of housing 18. Where this is done, rotation of the impeller 26, as by energization of the motor 10, will cause the blade 38 to move through the water. As it does so, blade 38 will bend due to the resistive forces of the water. The exact amount of bending of the blade 38 will be determined by the speed at which the impeller 26 rotates; and in that sense the blade 38 will tend to provide the same amount of pumping action over an appreciable speed range. When the speed is great the rubber blade 38 will bend sharply and present a small projected area to the water, and when the speed is moderate the blade will not bend as sharply and will present a larger projected area to the water; thus the product of force times area should be approximately the same at all speeds within a given range of speeds.

The blade 38 is preferably made so its horizontal dimension is equal to or slightly greater than the internal diameter of the center cylinder 40. Such dimensioning enables frictional forces to be created between the ends of blade 38 and the inner surface of that center cylinder 40; and those frictional forces enable the blade 38 to quickly assume an air foil configuration. Once that configuration has been assumed, it will be maintained by the force of the water; and the frictional forces between blade and guard will disappear. This arrangement provides prompt bending of blade 38 without causing continued frictional losses.

As the impeller 26 rotates it will create areas of reduced pressure behind the blade 38, and those areas will facilitate the movement of air to outlet 32. The air will pass between arms 20 to the inlet 34 in the body 25 of impeller 26 and will then pass through the hollow body 25 of impeller 26 to the outlet 32. The air issuing from outlet 32 will not be able to move upward immediately because of the washer 30 which projects radially outwardly beyond the periphery of the body of impeller 26. That washer will coact with the water which surrounds the impeller 26 to confine the air momentarily; and while so confined, that air will be broken into minute bubbles which will be admixed with small droplets of water created by the rotation of the blade 38 through the water. Thereafter the mixture of air and water will be forced outwardly into the axially-extending recesses of guard 40. That mixture of air and water will weigh considerably less than water alone, and that mixture will rise to the top of guard 40.

The top of the guard 40 will preferably be below the water level in jar 46, and thus the mixture of air and water will have to pass through a layer of water above guard 40 as well as the water in the recesses 61 and 62 of guard 40. However, because of the light weight of the air and water mixture, it will easily move to the top of guard 40 and then pass through the layer of water above that guard. By having the water level above the top of the guard 40, the present invention obviates the need of raising the air and water mixture above the water level.

The air will be under a reduced pressure as it is drawn from the outlet 32 into the areas of reduced pressure behind the blade 38, but the pressure on that air will rise quickly as the air is mixed with water and is moved outwardly into the water. The pressure on that air will then be atmospheric pressure plus the pressure due to the weight of water above outlet 32. In passing from an area of reduced pressure to an area where the pressure is higher, the air will tend to be further dissolved by the water.

As the mixture of air and water moves upwardly through the recesses in the guard 40, additional water will flow in through the screen 44 to the vicinity of the blade 38. This flow will be gravity-induced and it will supply all of the water that is to be admixed with air. The guard 40 will prevent any short-circuiting of the blade 38, due to movement of water through a small-radius circle from a point immediately above the blade to a point immediately below the blade, and the guard 40 will force the water and air to rise all the way to the top of the guard. Before the water of the mixture can be contacted by the blade 38 again, it will have to sink down to the level of the bottom of guard 40, be drawn through screen 44, and then moved upwardly to blade 38. This provides full circulation of all the water in the container 46, and thus assures ample aeration of all of that water. Moreover by having the inlet at the bottom of the guard 40 and by having the outlet at the top of the guard 40, it is possible to have gentle circulation of the water in the container rather than a violent counter-current flow at one point. This will be the case irrespective of the depth of the container as long as the guard 40 extends down to a point adjacent the bottom of the container.

The resilient bushing 22 compensates for any slight misalignment that might exist between the shaft of the motor 10 and the impeller 26. The connector 28 permits ready securement of impeller 26 to the motor shaft, and it also facilitates ready separation of that impeller from that shaft.

A modified form of impeller is shown in Fig. 6, and that impeller is denoted by the numeral 48. Impeller 48 has a hollow body 49 similar to the hollow body 25 of impeller 26, a washer 50 similar to the washer 30 of impeller 26, it has an inlet 54 similar to the inlet 34 of impeller 26, and it has a resilient blade 58 similar to the blade 38 of impeller 26. The fundamental difference between the two impellers is that the flattened portions 56 of impeller 48 are longer than the flattened portion 36 of impeller 26; and those longer flattened portions leave a slot 52 at each side of impeller 48 above the blade 58. These slots serve as air outlets for the body 49 of impeller 48; and it has been found that impeller 48 is able to draw air downwardly more readily at lower speeds than will the impeller 26. However, both impellers are remarkably efficient in causing oxygen to be dissolved in, and carbon dioxide ($CO_2$) to be liberated from, water.

When the device is motionless, water may enter opening 32 in the body 25 of impeller 26 or slot 52 in the body 49 of impeller 48, and that water could rise upwardly in impellers 26 and 48. If the water reaches the openings 34 and 54 of the bodies of those impellers it may pass outwardly into the housing 18. However, that water will quickly be pumped down to the level of openings 34 or 54 when the motor 10 starts. Thereafter air will move freely to openings 34 or 54 and down to outlets 32 or 52.

Whereas two preferred embodiments of the present invention have been shown and described in the drawing and accompanying description it should be obvious to those skilled in the art that various changes may be made in the form of the invention without affecting the scope thereof.

What I claim is:

1. A water-aerating device that comprises an impeller which has an extended hollow shaft and a broad flat blade that extends transversely of said shaft and projects radially outwardly beyond the periphery of said shaft, said blade being of resilient material and being parallel to the axis of said shaft, an inlet in said shaft, an outlet in said shaft, said outlet being above and closely adjacent to said blade, a radially extending plate mounted on said shaft and disposed closely above said outlet, said plate rotating with said shaft and coacting with water around said shaft to momentarily confine upward flow of air issuing from said outlet, a housing enclosing part of said impeller, a guard telescoped over said housing, recesses in said guard extending coaxially of said housing, and a motor to rotate said impeller, said blade being disposed intermediate the top and bottom of said guard and being adapted to respond to rotation of said shaft to bend at both ends and to draw water into the bottom of said guard and dispel a mixture of water and air into said recesses in said guard for movement to the top of said guard, said blade drawing air from said outlet in said shaft and forcing said air to move outwardly beyond said ends of said blade, each of said ends of said blade striking air bubbles that escape from behind the other end of said blade.

2. A water-aerating device that comprises an impeller which has an extended hollow shaft and a blade that extends transversely of said shaft and that projects radially outwardly beyond said shaft, said blade being of resilient material, an inlet in said shaft, an outlet in said shaft, a radially-extending plate disposed closely above said outlet, said plate coacting with water around said shaft to momentarily retard upward flow of air issuing from said outlet, a guard that telescopes over said impeller, recesses in said guard that extend coaxially of said guard, and a motor to rotate said impeller, said blade being dimensioned to engage said guard and be bent thereby as said shaft rotates, said blade being disposed intermediate the top and bottom of said guard and being adapted to draw water into the bottom of said guard and to draw air from said outlet, said blade moving said air and water out to the ends of said blade and urging that air and water into said recesses in said guard whereby said blade can dispel a mixture of water and air from the top of said guard.

EUGENE M. POIROT.

References Cited in the file of this patent

UNITED STATES PATENTS

| Number | Name | Date |
|---|---|---|
| 654,378 | Barckdall | July 24, 1900 |
| 1,383,881 | Thomas | July 5, 1921 |
| 1,619,637 | Schroeder | Mar. 1, 1927 |
| 1,665,262 | Hirschy | Apr. 10, 1928 |
| 1,704,025 | Wahl | Mar. 5, 1929 |
| 1,796,278 | Bakewell | Mar. 17, 1931 |
| 2,061,564 | Drake et al. | Nov. 24, 1936 |
| 2,137,397 | Haldeman | Nov. 22, 1938 |
| 2,217,231 | Morse | Oct. 8, 1940 |
| 2,288,063 | Ashlock, Jr. | June 30, 1942 |